(12) United States Patent
Nakanishi et al.

(10) Patent No.: US 11,542,985 B2
(45) Date of Patent: Jan. 3, 2023

(54) ROLLING BEARING AND WIND POWER GENERATION ROTOR SHAFT SUPPORT DEVICE

(71) Applicant: NTN CORPORATION, Osaka (JP)

(72) Inventors: Masaki Nakanishi, Mie (JP); Hidenobu Mikami, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/278,322

(22) PCT Filed: Sep. 26, 2019

(86) PCT No.: PCT/JP2019/037948
§ 371 (c)(1),
(2) Date: Mar. 21, 2021

(87) PCT Pub. No.: WO2020/067334
PCT Pub. Date: Apr. 2, 2020

(65) Prior Publication Data
US 2021/0348651 A1    Nov. 11, 2021

(30) Foreign Application Priority Data

Sep. 26, 2018  (JP) .............................. JP2018-180924
Jan. 30, 2019  (JP) .............................. JP2019-014883
Sep. 26, 2019  (JP) .............................. JP2019-174939

(51) Int. Cl.
*F16C 33/62*  (2006.01)
*F16C 33/66*  (2006.01)
(Continued)

(52) U.S. Cl.
CPC .............. *F16C 33/62* (2013.01); *F03D 80/70* (2016.05); *F16C 19/166* (2013.01); *F16C 19/38* (2013.01);
(Continued)

(58) Field of Classification Search
CPC ...... F16C 19/166; F16C 19/38; F16C 23/086; F16C 23/088; F16C 33/34; F16C 33/36;
(Continued)

(56) References Cited

U.S. PATENT DOCUMENTS 5,586,826 A     12/1996  Kellstrom et al.
6,471,410 B1 *  10/2002  Jacobson ............... F16C 33/385
                                                        384/492

(Continued)

FOREIGN PATENT DOCUMENTS

CN    102144021 A    8/2011
CN    102483093 A    5/2012
(Continued)

OTHER PUBLICATIONS

Machine English translation of JP4178826B dated Nov. 12, 2008.
(Continued)

*Primary Examiner* — Phillip A Johnson
(74) *Attorney, Agent, or Firm* — Hedman & Costigan, P.C.; James V. Costigan; Kathleen A. Costigan

(57) ABSTRACT

To provide a rolling bearing having a hard film on an inner ring raceway surface and an outer ring raceway surface of the rolling bearing that improves peeling resistance of the hard film, shows the original property of the hard film, and suppresses the attackability to a mating material. A rolling bearing 1 has an inner ring 2 having an inner ring raceway surface 2a on an outer circumference, an outer ring 3 having an outer ring raceway surface 3a on an inner circumference, and rolling elements 4 that roll between the inner ring raceway surface 2a and the outer ring raceway surface 3a. A hard film 8 includes a foundation layer formed directly on the inner ring raceway surface 2a or the outer ring raceway surface 3a and mainly formed of Cr and WC, a mixed layer having a gradient composition formed on the foundation
(Continued)

(a)

(b)

layer and mainly formed of WC and DLC, and a surface layer formed on the mixed layer and mainly formed of DLC. In a roughness curve of a surface on which the foundation layer is formed, the arithmetical mean roughness Ra is 0.3 µm or less and the root mean square gradient RΔq is 0.05 or less.

6 Claims, 10 Drawing Sheets

(51) Int. Cl.
   *F03D 80/70* (2016.01)
   *F16C 19/38* (2006.01)
   *F16C 33/34* (2006.01)
   *F16C 23/08* (2006.01)
   *F16C 19/16* (2006.01)
(52) U.S. Cl.
   CPC ............ *F16C 23/086* (2013.01); *F16C 33/34* (2013.01); *F16C 33/6696* (2013.01); *F16C 2206/04* (2013.01); *F16C 2206/82* (2013.01); *F16C 2360/31* (2013.01)
(58) Field of Classification Search
   CPC ............... F16C 33/366; F16C 33/6696; F16C 2206/04; F16C 2206/82; F03D 80/70; C22C 29/10
   See application file for complete search history.

(56) References Cited

U.S. PATENT DOCUMENTS

| | | | |
|---|---|---|---|
| 6,994,475 B2* | 2/2006 | Doll | F16C 33/3806 384/492 |
| 2006/0274985 A1* | 12/2006 | Engler | F16C 33/201 384/492 |
| 2007/0127858 A1 | 6/2007 | Nakagawa | |
| 2007/0297706 A1 | 12/2007 | Mori | |
| 2009/0283710 A1* | 11/2009 | Bertini | B23P 11/00 251/324 |
| 2013/0016937 A1* | 1/2013 | Tsutsui | C23C 28/36 384/492 |
| 2013/0170780 A1 | 7/2013 | Saito et al. | |
| 2013/0343689 A1* | 12/2013 | Kobayashi | F16C 33/34 384/569 |
| 2014/0219595 A1* | 8/2014 | Tsutsui | F16C 33/64 384/492 |
| 2019/0024712 A1 | 1/2019 | Yamamoto et al. | |

FOREIGN PATENT DOCUMENTS

| | | |
|---|---|---|
| CN | 103814150 A | 5/2014 |
| CN | 105051390 A | 11/2015 |
| CN | 108603530 A | 9/2018 |
| CN | 108884867 A | 11/2018 |
| EP | 1705392 A1 | 9/2006 |
| EP | 2458237 A1 | 5/2012 |
| EP | 2759620 A1 | 7/2014 |
| EP | 3406923 A1 | 11/2018 |
| EP | 3434918 A1 | 1/2019 |
| JP | 2005-147330 A | 6/2005 |
| JP | 2005-207517 A | 8/2005 |
| JP | 2006-090345 A | 4/2006 |
| JP | 2006-090346 A | 4/2006 |
| JP | 3961739 B | 8/2007 |
| JP | 2007-269121 A | 10/2007 |
| JP | 4178826 B | 11/2008 |
| JP | 2011-196543 A | 10/2011 |
| JP | 2013-092175 A | 5/2013 |
| JP | 2014-190508 A | 10/2014 |
| JP | 2016-196958 A | 11/2016 |
| JP | 2017-150597 A | 8/2017 |
| JP | 2017-180831 A | 10/2017 |
| JP | 2017-180832 A | 10/2017 |
| JP | 2018-146108 A | 9/2018 |
| WO | 2005/050038 A1 | 2/2005 |
| WO | 2006/033320 A1 | 3/2006 |
| WO | 2011/105077 A1 | 9/2011 |
| WO | 2014/156206 A1 | 10/2014 |
| WO | 2016/159137 A1 | 10/2016 |
| WO | 2017/126323 A1 | 7/2017 |
| WO | 2017/164325 A1 | 9/2017 |
| WO | 2018/164139 A1 | 9/2018 |

OTHER PUBLICATIONS

Machine English translation of JP3961739B dated Aug. 22, 2007.
Machine translation of JP2018-146108A dated Sep. 20, 2008.
Machine translation of JP2007-269121A dated Oct. 18, 2007.
Machine translation of JP2011-196543A dated Oct. 6, 2011.
Machine translation of JP2013-092175A dated May 16, 2013.
Machine translation of JP2014-190508A dated Oct. 6, 2014.
Machine translation of JP2016-196958A dated Nov. 24, 2016.
Machine translation of JP2017-180832A dated Oct. 5, 2017.
Machine translation of CN102483093A dated May 30, 2012.
Machine translation of CN105051390A dated Nov. 11, 2015.
Machine translation of CN108603530A dated Sep. 28, 2018.
Machine translation of JP2005-147330A dated Jun. 9, 2005.
Machine translation of JP2005-207517A dated Aug. 4, 2005.
Machine translation of JP2006-090345A dated Apr. 6, 2006.
Machine translation of JP2006-090346A dated Apr. 6, 2006.
Machine translation of CN108884867A dated Nov, 23, 2018.
Machine translation of JP2017-180831A dated Oct. 5, 2017.
Machine translation of JP2017-150597A dated Aug. 31, 2017.
Supplementary European Search Report issued in the corresponding European Patent Application—dated Apr. 22, 2022.
Machine English translation of CN102144021A dated Aug. 3, 2011.
Machine English translation of CN103814150A dated May 21, 2014.

* cited by examiner (a)        (b)

ROLLING BEARING AND WIND POWER GENERATION ROTOR SHAFT SUPPORT DEVICE

TECHNICAL FIELD

The present invention relates to a rolling bearing in which a hard film including a diamond-like carbon is formed on a surface of an inner ring, an outer ring, and a rolling element, which are bearing components. In particular, the present invention relates to a double-row self-aligning roller bearing applied to a usage to which a high load is applied, for example a bearing that supports a rotor shaft of a wind power generator. Further, the present invention relates to a wind power generation rotor shaft support device having the double-row self-aligning roller bearing.

BACKGROUND ART

A hard carbon film is a hard film generally called diamond-like carbon (hereinafter, referred to as DLC. A film or a layer mainly formed of DLC is also called a DLC film or a DLC layer). Various names are given to the hard carbon. For example, it is called hard amorphous carbon, amorphous carbon, hard amorphous-type carbon, i-carbon, and diamond-shaped carbon. These terminologies are not clearly distinguished from one another.

As the essential quality of the DLC for which the above-described terminologies are used, the DLC has a structure in which diamond and graphite are mixed with each other and thus its structure is intermediate between that of the diamond and that of the graphite. The DLC has high hardness almost equal to that of the diamond and is excellent in its wear resistance, solid lubricating property, thermal conductivity, chemical stability, and corrosion resistance. Therefore the DLC has been utilized as protection films of dies, tools, wear-resistant mechanical parts, abrasive materials, sliding members, magnetic and optical parts. As methods of forming the DLC film, a physical vapor deposition (hereinafter, referred to as PVD) method such as a sputtering method and an ion plating method; a chemical vapor deposition (hereinafter, referred to as CVD) method; and an unbalanced magnetron sputtering (hereinafter, referred to as UBMS) method are adopted.

Conventionally, attempts are made to form the DLC film on raceway surfaces of bearing rings of a rolling bearing, and rolling contact surfaces of rolling elements thereof. Extremely large internal stress is generated when the DLC film is formed. Although the DLC film has high hardness and high Young's modulus, the DLC film has extremely small deformability. Thus, the DLC film has disadvantages that it is low in its adhesiveness to a base material and liable to peel therefrom. When the DLC film peels off, metal contact is caused between the bearing components. Accordingly, when the bearing components are worn, wear debris is interposed between the rolling contact surfaces, which results in the damage of the raceway surface. Thus, in forming the DLC film on the raceway surfaces of the bearing rings of the rolling bearing, and the rolling contact surfaces of the rolling elements thereof, it is necessary to improve its adhesiveness to the surfaces of the bearing components.

For example, in order to improve the adhesiveness of the DLC film to the base material by disposing an intermediate layer, a rolling device in which a foundation layer that contains any one or more elements selected from among chromium (hereinafter, referred to as Cr), tungsten (hereinafter, referred to as W), titanium (hereinafter, referred to as Ti), silicon (hereinafter, referred to as Si), nickel, and iron as its composition; an intermediate layer that is formed on the foundation layer and contains the same constituent elements as those of the foundation layer and carbon such that the content rate of the carbon is larger at the side opposite to the foundation layer than at the side of the foundation layer; and a DLC layer that is formed on the intermediate layer and contains argon and carbon such that the content rate of the argon is not less than 0.02 mass % nor more than 5 mass %, has been proposed (see Patent Document 1).

In order to improve the adhesiveness of the DLC film to the base material by an anchoring effect, a rolling bearing in which unevenness of which height is 10-100 nm and average width is not more than 300 nm are formed on a raceway surface by means of ion bombardment process and the DLC film is formed on the raceway surface, has been proposed (see Patent Document 2).

PRIOR ART DOCUMENTS

Patent Documents

Patent Document 1: Japanese Patent No. 4178826
Patent Document 2: Japanese Patent No. 3961739

It is not easy to secure the peeling resistance of the film (to prevent flaking) under a high contact surface pressure caused by a rolling and sliding movement, in particular, it might be more difficult to secure the peeling resistance of the film under a lubrication operation condition that may cause much stronger shear force due to the sliding friction. The sliding surface to which the DLC film is likely applied is apt to be inferior in lubrication state and thereby sliding is caused, and therefore the operation condition might be severe compared to that of the general rolling bearing.

Further, the wear of an outer circumference or an end surface other than the raceway surface or a sliding resistance in a sealing groove might cause a problem in the bearing, and thus the DLC application to the surface other than the raceway surface is an effective measure to improve the durability and the functionality of the bearing.

Further, the DLC film is a hard film that might cause the wear such as abrasive wear on the mating material with which the DLC film contacts. In particular, in a case in which the DLC film is used under a condition of a high load causing rolling and sliding wear, the attackability of the DLC film to the mating material might be increased.

An object of the present invention is, in order to solve such a problem, to provide a rolling bearing capable of improving peeling resistance of a DLC film formed on, for example, an inner ring raceway surface and an outer ring raceway surface of the rolling bearing to show the original properties of the DLC film, and capable of suppressing attackability to a mating material. Further, another object of the present invention is to provide a wind power generation rotor shaft support device to which the rolling bearing is applied.

Means for Solving the Problem

A rolling bearing according to the present invention includes: an inner ring having an inner ring raceway surface on an outer circumference; an outer ring having an outer ring raceway surface on an inner circumference; rolling elements that roll between the inner ring raceway surface and the outer ring raceway surface, wherein the inner ring, the outer ring, and the rolling elements are formed of iron-based material; and a hard film. The hard film includes: a foundation layer formed directly on at least one surface selected from among the inner ring raceway surface, the outer ring raceway surface, and a rolling contact surface of the rolling element and mainly formed of chromium and tungsten carbide; a mixed layer formed on the foundation layer and mainly formed of tungsten carbide and diamond-like carbon; and a surface layer formed on the mixed layer and mainly formed of diamond-like carbon. The mixed layer has a composition in which a content rate of the tungsten carbide in the mixed layer is continuously or stepwise decreased and a content rate of diamond-like carbon in the mixed layer is continuously or stepwise increased from a side of the foundation layer toward a side of the surface layer. In a roughness curve of a surface on which the foundation layer is formed, the arithmetical mean roughness Ra is 0.3 μm or less and the root mean square gradient R$\Delta$q is 0.05 or less.

The skewness Rsk acquired from the roughness curve of the surface on which the foundation layer is formed may be −0.2 or less.

The maximum peak height Rp acquired from the roughness curve of the surface on which the foundation layer is formed may be 0.4 μm or less.

The surface layer may have a gradient layer of which the hardness is continuously or stepwise increased from a side of the mixed layer, at a side of the mixed layer.

The iron-based material may be high carbon chromium bearing steel, carbon steel, tool steel, or martensitic stainless steel.

The rolling bearing may be formed to support a rotor shaft to which a blade of a wind power generator is mounted. Further, the rolling bearing may be formed as a double-row self-aligning roller bearing including rollers interposed between the inner ring and the outer ring, as the rolling elements to be aligned in two rows in an axial direction. The outer ring raceway surface may be formed in a spherical shape, and the outer circumference of each of the rollers may be formed in a shape along the outer ring raceway surface.

A wind power generation rotor shaft support device according to the present invention includes one or more bearings disposed in a housing, the bearings being formed to support a rotor shaft to which a blade is mounted. At least one of the bearings is formed as the double-row self-aligning roller bearing. A part of the double-row self-aligning roller bearing, in a row far away from the blade is formed to receive a large load compared to a part of the double-row self-aligning roller bearing, in a row close to the blade.

Effect of the Invention

In the rolling bearing according to the present invention, the inner ring, the outer ring, and the rolling elements are formed of iron-based material, and the hard film having a predetermined structure including DLC is formed on at least one surface selected from among the inner ring raceway surface, the outer ring raceway surface, and the rolling contact surface of the rolling element. WC used in the mixed layer has the hardness and the modulus of elasticity intermediate between those of Cr and DLC, and the concentration of the residual stress is hardly caused after the mixed layer is formed. Further, the mixed layer has a gradient composition of WC and DLC, so that WC and DLC are physically connected to each other.

Further, the foundation layer formed directly on at least one surface selected from among the inner ring raceway surface, the outer ring raceway surface, and the rolling contact surface of the rolling element includes Cr and thus is compatible with the iron-based material. Accordingly, the foundation layer is superior in its adhesiveness, compared to a layer formed of W or Si. In addition, in the roughness curve of the surface (a surface of the base material) on which the foundation layer is formed, the arithmetical mean roughness Ra is 0.3 μm or less and the root mean square gradient R$\Delta$q is 0.05 or less, and thereby the roughness is small enough. Further, the roughness projection is not sharp and thus the stress concentration due to the contact of the projection is suppressed. As a result, superior peeling resistance of the hard film can be obtained, and the attackability thereof to the mating material can be suppressed.

With the configuration described above, the hard film formed on, for example, the inner ring raceway surface, the outer ring raceway surface or the rolling contact surface of the rolling element, is superior in its peeling resistance and thereby the hard film can show the original properties of DLC. As a result, the rolling bearing according to the present invention becomes superior in its seizure resistance, wear resistance, and corrosion resistance. Consequently, the damage on the raceway surface or the like becomes less even in a severe lubrication state, and thereby the lifetime thereof can be made long.

The wind power generation rotor shaft support device according to the present invention supports the rotor shaft to which the blade is mounted, by using at least the rolling bearing according to the present invention. Thus, superior peeling resistance of the hard film can be obtained under a condition of a high load or an inferior lubrication state causing sliding, and thereby the attackability to the mating material can be suppressed. Further, the lifetime of the bearing is made long and maintenance-free thereof is achieved. Further, the bearing is formed as a double-row self-aligning roller bearing having the rollers aligned in two rows in an axial direction, interposed between the inner ring and the outer ring, and thus the bearing is suitable to a unique use state for the wind power generator rotor shaft bearing in which a relatively large thrust load is applied to the roller in one of the two rows.

MODE FOR CARRYING OUT THE INVENTION

A hard film such as a DLC film has residual stress therein. The residual stress is largely different depending on an influence of a film structure or a film forming condition. As a result, the peeling resistance is largely affected. Also, the peeling resistance is changed depending on surface roughness of a base material on which the hard film is formed. The DLC film is a hard film that is apt to cause wear such as abrasive wear, on a mating material. The mechanism of the wear is based on a local stress concentration in a fine projection in the roughness. Even in a contact state between steel materials themselves not causing a problem, if the hard film is interposed between the steel materials, more precise roughness management is necessary. The prevent inventors conducted a study using base materials different in roughness parameter under a condition of a high load and causing rolling and sliding friction. As a result of the study, the present inventors found that the attackability of the hard film, which is formed on the surface of the bearing component, to the mating material is suppressed and the peeling resistance thereof is improved by adopting a specific film structure of the hard film and setting the arithmetical mean roughness Ra and the root mean square gradient RΔq (and the skewness Rsk) of a roughness curve of the surface of the base material in predetermined ranges, respectively. The present invention has been derived from such knowledge.

Figure 1:
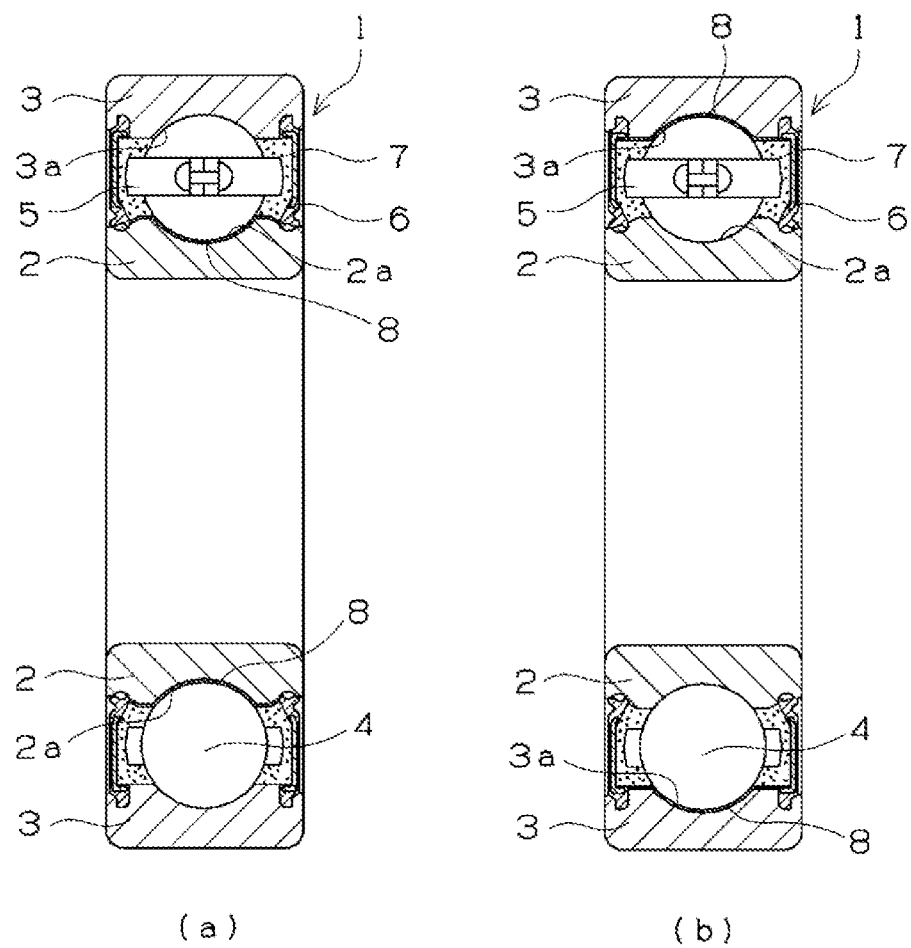
FIGS. 1(a) and 1(b) are cross-sectional views illustrating one example of a rolling bearing according to the present invention.
Figure 2:
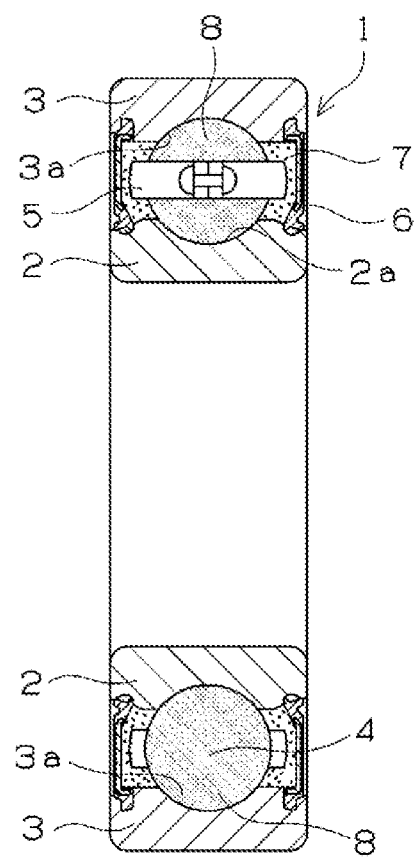
FIG. 2 is a cross-sectional view illustrating another example of the rolling bearing according to the present invention.

A rolling bearing according to the present invention will be described with reference to FIGS. 1(a) and 1(b), and FIG. 2. FIGS. 1(a) and 1(b) illustrate cross-sectional views of a rolling bearing (deep groove ball bearing) in which a hard film described below is formed on an inner ring raceway surface and an outer ring raceway surface. FIG. 2 illustrates a cross-sectional view of a rolling bearing (deep groove ball bearing) in which the hard film is formed on a rolling contact surface of a rolling element. A rolling bearing 1 is provided with an inner ring 2 having an inner ring raceway surface 2a on its outer circumference, an outer ring 3 having an outer ring raceway surface 3a on its inner circumference, and a plurality of rolling elements 4 that roll between the inner ring raceway surface 2a and the outer ring raceway surface 3a. A cage 5 retains the rolling elements 4 at regular intervals. A sealing member 6 seals an opening formed at each of axial ends of the inner ring and the outer ring. Grease 7 is sealed in a space of the bearing. As the grease 7, known grease for the rolling bearing can be adopted.

For example in the rolling bearing shown in FIG. 1(a), a hard film 8 is formed on an outer circumferential surface (including the inner ring raceway surface 2a) of the inner ring 2. In the rolling bearing shown in FIG. 1(b), the hard film 8 is formed on an inner circumferential surface (including the outer ring raceway surface 3a) of the outer ring 3. However, the hard film may be formed on at least one surface of the inner ring, the outer ring, and the rolling element in accordance with an applicable use thereof.

In the rolling bearing shown in FIG. 2, the hard film 8 is formed on the rolling contact surface of each of the rolling elements 4. Since the rolling bearing shown in FIG. 2 is a deep groove ball bearing, the rolling elements thereof are balls, and the rolling contact surface of each of the rolling elements is entirely a spherical surface. In the case in which the hard film 8 is formed on the rolling elements of a cylindrical roller bearing or a tapered roller bearing used as a rolling bearing other than those shown in the figures, the hard film should be formed on at least the rolling contact surface (cylindrical outer circumference) of each of the rolling elements.

As shown in FIGS. 1(a) and 1(b), and FIG. 2, in order to guide the balls, which are the rolling elements 4, the inner ring raceway surface 2a of the deep groove ball bearing is formed as a circular curved surface which is an arc-groove shape in its section in an axial direction. Similarly, the outer ring raceway surface 3a is a circular curved surface which is an arc-groove shape in its section in an axial direction. As a diameter of a steel ball is dw, the curvature radius of the arc groove is approximately 0.51-0.54 dw. In the case in which the cylindrical roller bearing or the tapered roller bearing is used as the rolling bearing other than those shown in the figures, in order to guide the rollers of the bearing, each of the inner ring raceway surface and the outer ring raceway surface is formed in a curved surface in at least a circumferential direction thereof. Since a barrel-shaped roller is used as the rolling element in the case of a self-aligning roller bearing, each of the inner ring raceway surface and the outer ring raceway surface is formed in a curved surface in the axial direction thereof in addition to the circumferential direction thereof. In the rolling bearing according to the present invention, each of the inner ring raceway surface and the outer ring raceway surface may have any of the above-described configurations.

In the deep groove ball bearing 1 according to the present invention, the inner ring 2, the outer ring 3 and the rolling element 4, which are bearing components on which the hard film 8 is formed, are formed of iron-based material. As an iron-based material, any steel generally used in a bearing component may be adopted. Examples of the iron-based material include high carbon chromium bearing steel, carbon steel, tool steel, and martensitic stainless steel.

In these bearing components, the hardness of each of the surfaces on which the hard film is formed is preferably set to Vickers hardness of Hv 650 or more. By setting the hardness of the surface to Vickers hardness of Hv 650 or more, a difference between the hardness of the surface and that of the hard film (foundation layer) can be decreased and the adhesiveness to the hard film can be improved.

It is preferable that a nitrided layer is formed by means of nitriding treatment, on the surface on which the hard film is to be formed, before the hard film is formed on the surface. As the nitriding treatment, it is preferable to subject the surface of a base material to plasma nitriding treatment because the plasma nitriding treatment makes it difficult for an oxidized layer which deteriorates the adhesiveness between the hard film and the surface of the base material to be generated on the surface of the base material. It is preferable that the hardness of the surface after the nitriding treatment is Hv 1000 or more in Vickers hardness in order to further improve the adhesiveness to the hard film (foundation layer).

In the present invention, the surface on which the hard film is formed, namely the surface on which the foundation layer is formed, has the arithmetical mean roughness Ra of 0.3 μm or less and the root mean square gradient RΔq of 0.05 or less. The arithmetical mean roughness Ra is preferably set to 0.2 μm or less. The surface on which the hard film is formed may be subjected to the mirror-finishing treatment. The lower limit of the arithmetical mean roughness Ra is, for example, 0.005 μm or more but not especially limited thereto. The mirror-finishing treatment is disadvantage in productivity or production cost. Thus, the arithmetical mean roughness Ra is preferably set to 0.05 μm or more, more preferably 0.1 μm or more, from a viewpoint of producing. The root mean square gradient RΔq is preferably set to 0.03 or less, more preferably 0.02 or less. Each of the arithmetical mean roughness Ra and the root mean square gradient RΔq is measured based on JIS B 0601 using a contact type or non-contact type surface roughness tester. A specific measurement condition is a measurement length of 4 mm and a cutoff of 0.8 mm. By setting the root mean square gradient RΔq of the surface of the base material to 0.05 or less, the peak in the roughness curve is made gentle and the curvature radius of the projection is made large, so that the local surface pressure is decreased. Further, the micro-level electric field concentration due to the roughness when the film is formed is suppressed, and the local change in each of the film thickness and the hardness is prevented. Thus, the peeling resistance of the hard film is improved.

The maximum peak height Rp acquired from the roughness curve of the surface on which the foundation layer is formed is preferably set to 0.4 μm or less. The maximum peak height Rp is calculated based on JIS B 0601. A relationship between the maximum peak height Rp acquired from the roughness curve and the arithmetical mean roughness Ra is preferably set to $1 \leq Rp/Ra \leq 2$, more preferably $1.2 \leq Rp/Ra \leq 2$.

The skewness Rsk acquired from the roughness curve of the surface on which the foundation layer is formed is preferably set to a negative value. The skewness Rsk is an index of skewness and is preferably set to −0.2 or less. The skewness Rsk shows quantitatively a vertical symmetry of an amplitude distribution curve, namely an index indicating bias to an average line of the surface roughness. The skewness Rsk is calculated based on JIS B 0601. The negative of the skewness Rsk means that the roughness shape projects downward (concave), and therefore there are many flat portions on the surface. As a result, there are fewer projections and thus the stress concentration due to the projection is hardly caused. As a method for lessening the roughness, a method of removing the projection on the surface by the collision with the polishing media such as the barrel polishing may be adopted, however it should be paid attention that a projection might be newly generated depending on the polishing condition and thus the skewness Rsk might be turned into a positive value.

Figure 3:
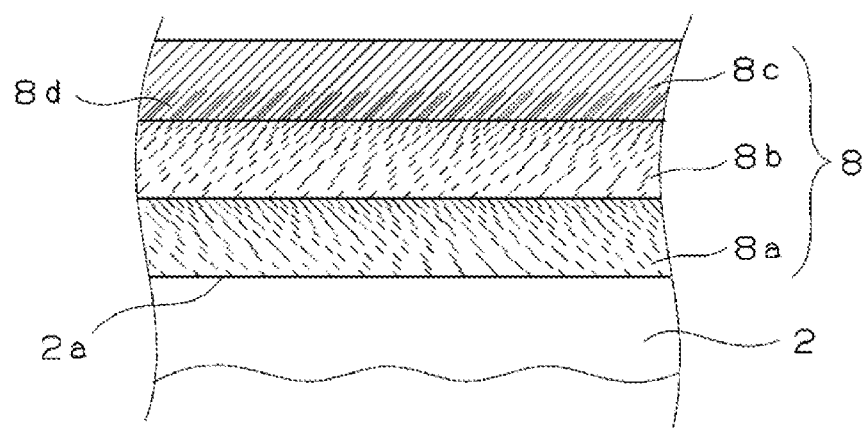
FIG. 3 is a schematic cross-sectional view illustrating a structure of a hard film.

A structure of the hard film according to the present invention will be described with reference to FIG. 3. FIG. 3 is a schematic cross-sectional view illustrating the structure of the hard film 8 shown in FIG. 1(*a*). As shown in FIG. 3, the hard film 8 has a three-layer structure formed of (1) a foundation layer 8*a* mainly formed of Cr and WC and formed directly on the inner ring raceway surface 2*a* of the inner ring 2, (2) a mixed layer 8*b* mainly formed of WC and DLC and formed on the foundation layer 8*a*, and (3) a surface layer 8*c* mainly formed of DLC and formed on the mixed layer 8*b*. The mixed layer 8*b* has a composition in which the content rate of WC in the mixed layer is continuously or stepwise decreased and the content rate of DLC in the mixed layer is continuously or stepwise increased from a side of the foundation layer 8*a* toward a side of the surface layer 8*c*. In the present invention, the structure of the hard film is the three-layer structure, so that a sudden change in the properties (hardness, modulus of elasticity, and the like) can be avoided.

The foundation layer 8*a* includes Cr and thus is compatible with the base material formed of a hard metal alloy material or an iron-based material. The foundation layer 8*a* is superior in its adhesiveness to the base material compared to a configuration using W, Ti, Si, or Al. WC used in the foundation layer 8*a* has the hardness and the modulus of elasticity intermediate between those of Cr and DLC, and the concentration of the residual stress is hardly caused after the foundation layer is formed. It is preferable that the foundation layer 8*a* has a gradient composition in which the content rate of Cr is decreased and the content rate of WC is increased from a side of the inner ring 2 toward a side of the mixed layer 8*b*. With this, superior adhesiveness of the foundation layer 8*a* to both of the inner ring 2 and the mixed layer 8*b* can be obtained.

The mixed layer 8*b* is formed as an intermediate layer interposed between the foundation layer and the surface layer. As described above, WC used in the mixed layer 8*b* has the hardness and the modulus of elasticity intermediate between those of Cr and DLC and makes it difficult for the residual stress to concentrate in the hard film after formed. Since the mixed layer 8*b* has the gradient composition in which the content rate of WC in the mixed layer is decreased and the content rate of DLC in the mixed layer is increased from a side of the foundation layer 8*a* toward a side of the surface layer 8*c*, superior adhesiveness of the mixed layer 8*b* to both of the foundation layer 8*a* and the surface layer 8*c* can be obtained. The mixed layer 8*b* has a structure in which WC and DLC are physically connected to each other, so that the break or the like in the mixed layer 8*b* can be prevented. Further, the content rate of DLC is high at the side of the surface layer 8*c*, and thereby superior adhesiveness of the mixed layer 8*b* to the surface layer 8*c* can be obtained. In the mixed layer 8*b*, DLC having high non-adhesiveness can be connected to the foundation layer 8*a* owing to an anchoring effect caused by the presence of WC.

The surface layer 8*c* is mainly formed of DLC. It is preferable that the surface layer 8*c* has a gradient layer 8*d* of which the hardness is continuously or stepwise increased from a side of the mixed layer 8*b*, at a side of the mixed layer 8*b*. The gradient layer is formed to avoid a sudden change of the bias voltage in a case in which the bias voltage for the mixed layer 8*b* and the bias voltage for the surface layer 8*c* are different from each other. The gradient layer is formed by continuously or stepwise changing (increasing) the bias voltage. Changing the bias voltage results in the hardness being gradient as described above in the gradient layer 8*d*. The hardness is continuously or stepwise increased because a component rate of a diamond structure ($sp^3$) in a DLC structure is increased due to the increase of the bias voltage rather than a component rate of a graphite structure ($sp^2$) in the DLC structure. With this, there is no sudden change of the hardness between the mixed layer and the surface layer, so that further superior adhesiveness between the mixed layer 8*b* and the surface layer 8*c* is obtained.

It is preferable to set the thickness of the hard film 8 (total of three layers) to 0.5-5.0 μm. When the thickness of the hard film is too thick, the peeling is liable to be caused due to the increase of the residual compression stress. However, in a case in which the shear stress is large on the surface under a rolling and sliding condition or the like, the peeling is liable to be caused easily as the thickness of the hard film becomes thinner. Thus, it is necessary to set the film thickness depending on the actual damage mode. It is also preferable to set the ratio of the thickness of the surface layer 8*c* to that of the hard film 8 to 0.8 or less. When the above-described ratio exceeds 0.8, the gradient composition for physically connecting WC and DLC in the mixed layer 8*b* to each other is liable to be uncontinuous, and thereby the adhesiveness of the mixed layer 8*b* might be deteriorated.

By adopting the hard film 8 of the three layers having the foundation layer 8*a*, the mixed layer 8*b*, and the surface layer 8*c*, superior peeling resistance can be obtained.

The hard film having the above-described structure and properties is formed on the rolling bearing of the present invention, so that the hard film can be prevented from wearing and peeling off even in a case in which the load caused by the rolling contact is applied to the hard film when using the rolling bearing. Consequently, even in a severe lubrication state, the damage of the raceway surface and the like can be suppressed and thereby the lifetime thereof can be made longer. In a rolling bearing in which grease has been sealed, when a newly formed metal surface is exposed due to the damage of the raceway surface or the like, the deterioration of the grease is accelerated by catalytic action. While, in the rolling bearing according to the present invention, the damage of the raceway surface or the rolling contact surface caused by metal contact can be prevented by the hard film and the deterioration of the grease can be also prevented.

Figure 7:
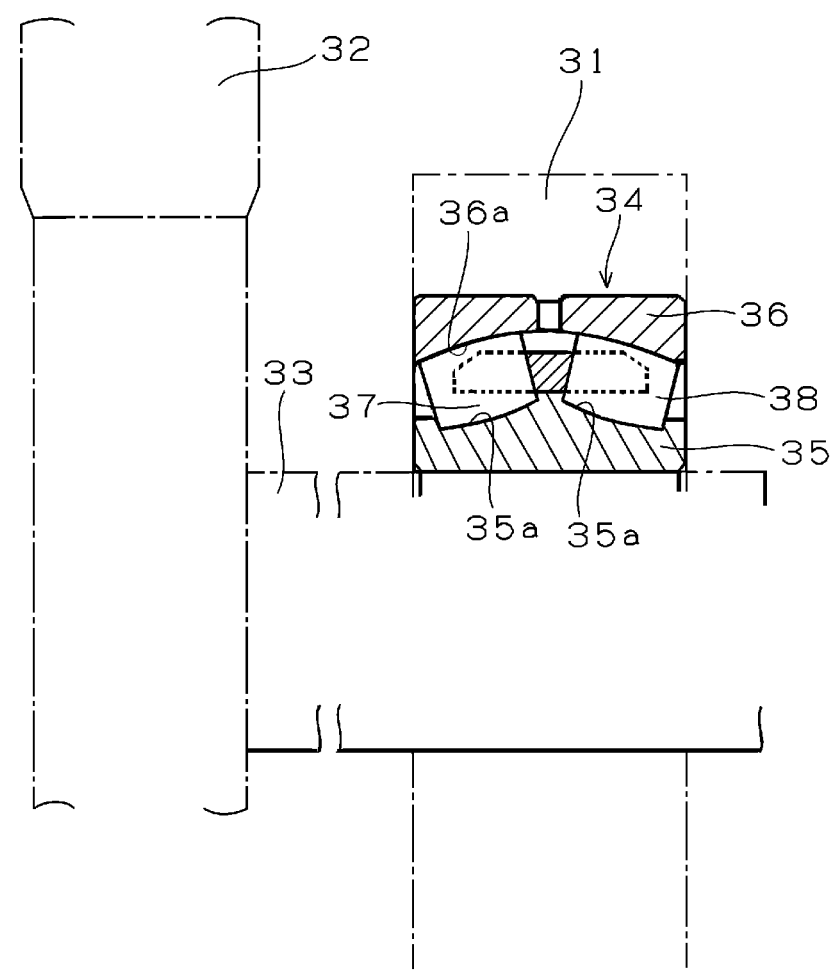
FIG. 7 is a view illustrating a rotor shaft support bearing in a conventional wind power generator.

A wind power generator to which the rolling bearing according to the present invention is applied will be described. Conventionally, as a rotor shaft bearing in a large wind power generator, a large double-row self-aligning roller bearing 34 as shown in FIG. 7 is generally adopted. A rotor shaft 33 to which a blade 32 is mounted is rotated by receiving wind power to accelerate the rotation speed using a speed increaser (not shown) and to rotate a generator, so that electric power is generated. When electric power is generated while receiving the wind power, the rotor shaft 33 that supports the blade 32 receives an axial direction load (bearing thrust load) and a radial direction load (bearing radial load) due to the wind power applied to the blade 32. The double-row self-aligning roller bearing 34 can receive the radial load and the thrust load at the same time, absorb an incline of the rotor shaft 33 caused by an accuracy error or amount error of a bearing housing 31 in order to sustain the aligning performance, and absorb the deformation of the rotor shaft 33 in operating. Thus, the double-row self-aligning roller bearing 34 is suitably used as a wind power generator rotor shaft bearing (see the catalogue of NTN CORPORATION "The New Generation of NTN Bearings for Wind Turbine" A65. CAT. No. 8404/04/JE, May 1, 2003).

As shown in FIG. 7, in the double-row self-aligning roller bearing that supports a rotor shaft for the wind power generation, the thrust load is larger than the radial load. Thus, a roller 38 at a row that receives the thrust load among the double-row rollers 37 and 38 mainly receives the radial load and the thrust load at the same time. Accordingly, the rolling fatigue lifetime is made short. Further, in the wind power generator, the rotation speed of the rotor shaft is not constant and the boundary lubrication is liable to be caused due to the shortage of the oil film thickness in the low rotation speed. In addition, since differential sliding is caused in a contact oval, damage or wear on the surface is liable to be caused. Further, since the thrust load is applied, the sliding movement is caused on a flange, and thereby the flange is worn. In addition, since the load at an opposite row is lightened, the roller 37 is slid on raceway surfaces 35a and 36a of an inner ring 35 and an outer ring 36, and thereby damage or wear on a surface of the roller 37 is caused. Thus, a large size bearing is adopted to solve the problems described above, however the capacity at the low load side becomes excessively large, and therefore it is uneconomical. Also, since the wind power generator rotor shaft bearing is operated in an unmanned state or arranged at a high place due to the large size of the blade 32, maintenance-free of the wind power generator rotor shaft bearing is desired.

Figure 4:
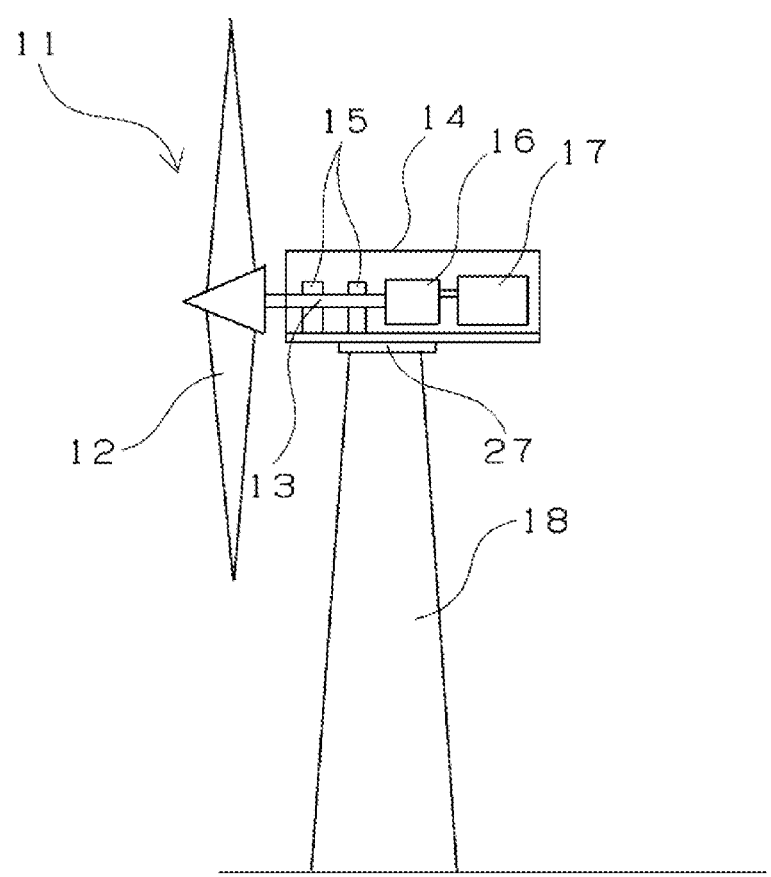
FIG. 4 is a schematic view illustrating a whole of a wind power generator including a wind power generation rotor shaft support device.
Figure 5:
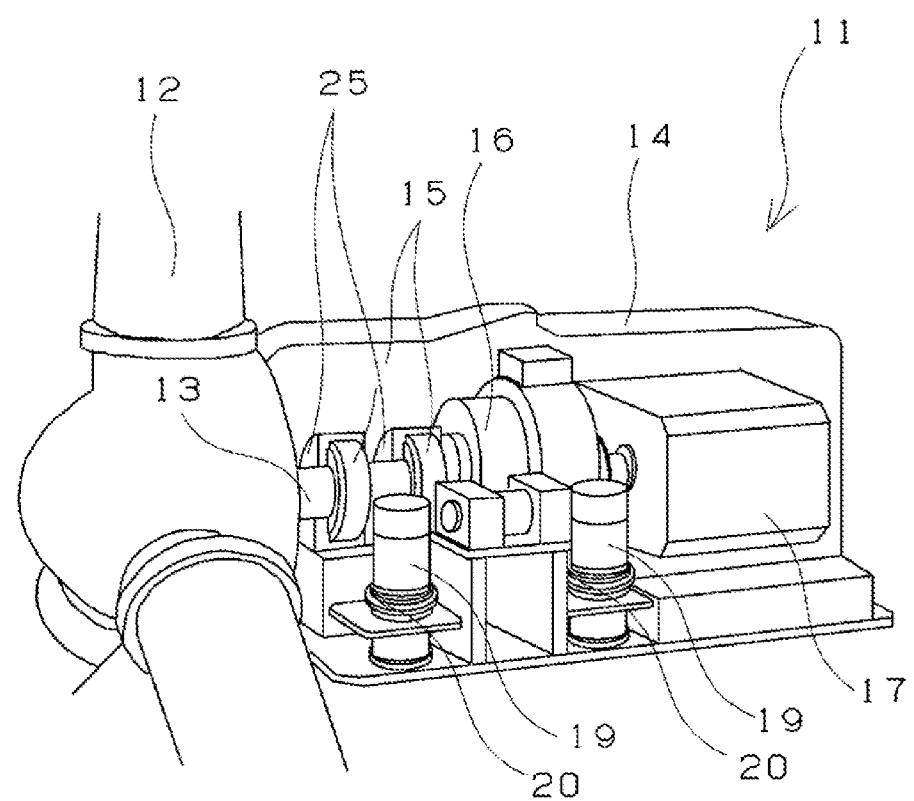
FIG. 5 is a view illustrating the wind power generation rotor shaft support device.

In order to solve the problems described above, the rolling bearing according to the present invention can be applied to a double-row self-aligning roller bearing of a wind power generation rotor shaft support device. An example in which the rolling bearing according to the present invention is applied to the wind power generation rotor shaft support device will be described with reference to FIG. 4 and FIG. 5. FIG. 4 is a schematic view illustrating a whole of the wind power generator including the wind power generation rotor shaft support device according to the present invention. FIG. 5 is a view illustrating the wind power generation rotor shaft support device shown in FIG. 4. As shown in FIG. 4, in a wind power generator 11, a rotor shaft 13 to which a blade 12 served as a wind turbine is mounted, is rotatably supported by a double-row self-aligning roller bearing 15 (hereinafter, also merely referred to as a bearing 15) disposed in a nacelle 14, and further a speed increaser 16 and a generator 17 are disposed in the nacelle 14. The speed increaser 16 increases the rotation speed of the rotor shaft 13 and transmits the rotation to an input shaft of the generator 17. The nacelle 14 is disposed on a support base 18 to be allowed to revolve via a revolving seat bearing 27. When a motor 19 for revolving (see FIG. 5) is driven, the nacelle 14 is revolved via a speed reducer 20 (see FIG. 5). The nacelle 14 is revolved to match the direction of the blade 12 with a wind direction. Two bearings 15 for supporting the rotor shaft are disposed in the example shown in FIG. 5, however the number of the bearings 15 may be one.

Figure 6:
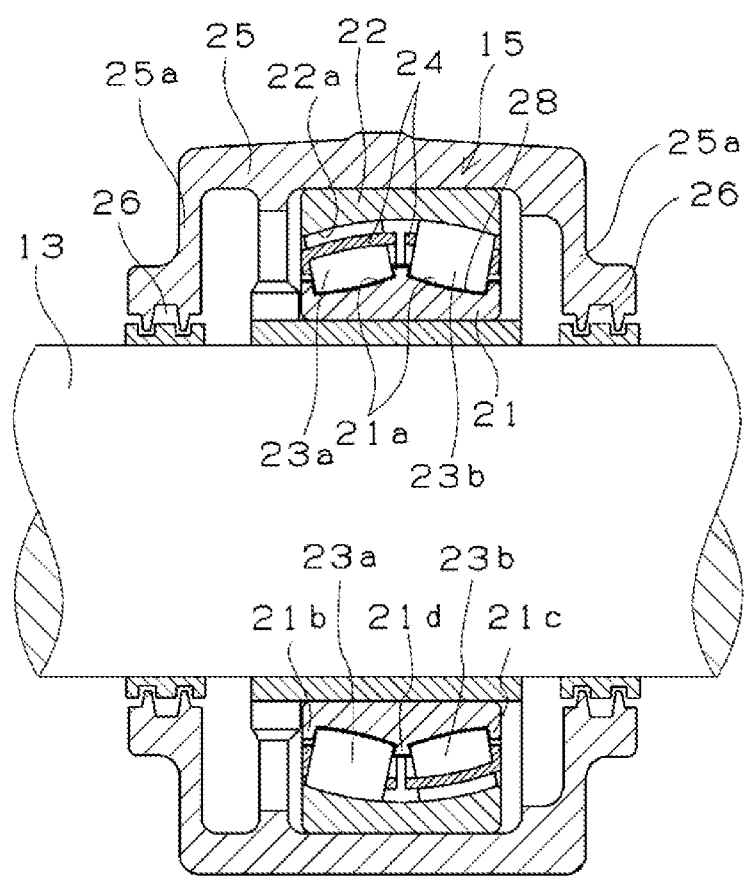
FIG. 6 is a schematic cross-sectional view illustrating a double-row self-aligning roller bearing according to the present invention.

FIG. 6 shows the double-row self-aligning roller bearing 15 that supports the rotor shaft of the wind power generator. The bearing 15 is provided with an inner ring 21 and an outer ring 22 that are served as a pair of raceway rings, and a plurality of rollers 23 interposed between the inner ring 21 and the outer ring 22. The rollers are interposed to be aligned in two rows in an axial direction of the bearing. In FIG. 6, the roller 23a is in a row closer to the blade (left row), and the roller 23b is in a row far away from the blade (right row). The bearing 15 is a radial bearing that can receive a thrust load. An outer ring raceway surface 22a of the bearing 15 is formed in a spherical shape. Each of the rollers is formed such that an outer circumference is formed in a spherical shape along the outer ring raceway surface 22a. A double-row inner ring raceway surface 21a having a section along outer circumferences of the roller 23a and the roller 23b in the left and right rows is formed on the inner ring 21. Small flanges 21b and 21c are disposed at both ends, respectively, of the outer circumference of the inner ring 21. An intermediate flange 21d is disposed at the center part of the outer circumference of the inner ring 21, namely between the roller 23a in the left row and the roller 23b in the right row. Each of the rollers 23a and 23b is retained in each row by a cage 24.

In the configuration described above, the outer circumference of each of the rollers 23a and 23b is brought into rolling contact with the inner ring raceway surface 21a and the outer ring raceway surface 22a. An inner end surface in the axial direction of the roller 23a is brought into sliding contact with one end surface in the axial direction of the intermediate flange 21d. An outer end surface in the axial direction of the roller 23a is brought into sliding contact with an inner end surface of the small flange 21b. An inner end surface in the axial direction of the roller 23b is brought into sliding contact with the other end surface in the axial direction of the intermediate flange 21d. An outer end surface in the axial direction of the roller 23b is brought into sliding contact with an inner end surface of the small flange 21c. The grease is sealed to reduce these frictions. As the grease, known grease for the rolling bearing can be adopted.

In FIG. 6, the outer ring 22 is disposed to be fitted with an inner diametrical surface of the bearing housing 25, and the inner ring 21 is fitted with an outer circumference of the rotor shaft 13 to support the rotor shaft 13. The bearing housing 25 has side walls 25a that cover both ends of the bearing 15, and a seal 26 such as a labyrinth seal is formed between the side walls 25a and the rotor shaft 13. The bearing 15 without a seal is adopted because the sealing can be obtained in the bearing housing 25. The bearing 15 is served as the wind power generator rotor shaft bearing according to the embodiment of the present invention.

In the double-row self-aligning roller bearing described above, the hard film described above is formed on a surface of a component brought into sliding contact (for example, rolling and sliding contact) with the roller. A high load is applied to the wind power generator rotor shaft bearing, and therefore the improvement of the wear resistance of bearing is expected due to the presence of the hard film, while the attackability of the hard film to the mating material and the peeling of the hard film might be concerned. The break mode of the double-row self-aligning roller bearing described above is the surface layer peeling such as wear or peeling, and the surface layer peeling is liable to be promoted the most in a loaded range of the outer ring. Thus, the target for which the wear is to be suppressed is the outer ring. However, since the DLC is a hard film, in a case in which the roughness of the roller before the hard film is applied is unfavorable, the attackability of the hard film is increased on the contrary, and therefore the wear of the outer ring might be promoted. Further, in a case in which the DLC peels off, there might be an unfavorable influence such as biting of the hard peeled piece to the rolling contact surface, and therefore it should be paid very careful attention to the peeling of the DLC.

The present inventors found that the attackability to the mating material and the peeling relate to the stress concentration in the projection on the surface roughness of the roller, which is a treated material, and found that the management of parameters such as the root mean square gradient RΔq focusing on the shape of the projection on the surface, in addition to the arithmetical mean roughness (Ra), which is usually adopted, is important. Accordingly, by setting the root mean square gradient RΔq of the roughness curve of the surface of the base material in a predetermined range, the attackability of the hard film to the mating material can be suppressed and the peeling resistance of the hard film can be improved. As a result, even in a case in which the hard film is brought into contact with other component under a condition of a high load and an inferior lubrication condition causing sliding, since the superior peeling resistance of the hard film can be obtained, the original properties of the hard film can be shown, and superior seizure resistance, wear resistance, and corrosion resistance thereof can be obtained. Consequently, the damage of the double-row self-aligning roller bearing caused by metal contact can be prevented.

An area on which the hard film is formed will be described below. In the bearing 15 shown in FIG. 6, a hard film 28 is formed on an outer circumference of the inner ring 21, which is a bearing component. The outer circumference of the inner ring 21 includes the raceway surface 21a, both end surfaces in the axial direction of the intermediate flange 21d, the inner end surface of the small flange 21b, and the inner end surface of the small flange 21c. In the configuration shown in FIG. 6, the hard film 28 is formed on a whole of the outer circumference of the inner ring 21 and also the hard film 28 is formed on a surface that is not brought into rolling and sliding contact with the rollers 23a and 23b. The area of the inner ring 21 on which the hard film 28 is formed is not limited to the configuration shown in FIG. 6. It is preferable that the hard film 28 is formed on the surface that is brought into sliding contact with the roller in the boundary lubrication state. For example, the hard film may be formed on at least one of the end surface among both end surfaces in the axial direction of the intermediate flange 21d, the inner end surface of the small flange 21b, and the inner end surface of the small flange 21c that are brought into sliding contact with each of the rollers 23a and 23b.

As described above, in the self-aligning roller bearing as the wind power generator rotor shaft bearing, the roller (roller 23b) in a row far away from the blade receives a large thrust load compared to the roller (roller 23a) in a row closer to the blade. In this case, the area brought into sliding contact with the roller 23b is apt to be especially the boundary lubrication. Thus, considering that loads different in magnitude from each other are applied to the rollers in two rows aligned in the axial direction, the hard film may be formed only on the inner end surface of the small flange 21c among the small flanges 21b and 21c.

The roller causes sliding while rolling between the inner ring and the outer ring. The hard film shown in FIG. 6 is used under such a condition. Further, the area on which the hard film is formed is not limited to the area shown in FIG. 6. Therefore, the hard film may be formed on any surface of at least one bearing component selected from among the inner ring, the outer ring, and the roller that are to be brought into the condition described above.

In the configuration shown in FIG. 6, the hard film 28 is formed on the outer circumference of the inner ring 21, however, instead of this or in addition to this, the hard film 28 may be formed on the surfaces of each of the outer ring 22 and the rollers 23a and 23b. In a configuration in which the hard film is formed on the outer ring 22, it is preferable that the hard film is formed on an inner circumference (including outer ring raceway surface 22a) of the outer ring 22. While, in a configuration in which the hard film is formed on the surfaces of the rollers 23a and 23b, the hard film may be formed on both end surfaces of each of the rollers 23a and 23b. Further, considering the difference of loads applied to the rollers, the hard film may be formed on both end surfaces of only the roller 23b. Further, the hard film may be formed on the outer circumference of each of the rollers 23a and 23b. For example, the hard film may be formed on the outer circumference of the roller in at least one of the two rows.

Hereinafter, a film forming step of the hard film according to the present invention will be described. The film forming step includes a step that applies the surface finishing to a surface on which the foundation layer 8a is to be formed, a step that forms the foundation layer 8a, a step that forms the mixed layer 8b, and a step that forms the surface layer 8c using a UBMS apparatus that uses Ar gas as a sputtering gas. The hard film is obtained by forming the foundation layer 8a, the mixed layer 8b, and the surface layer 8c in this order on a surface of the bearing component to which the surface finishing has been applied.

Figure 8:
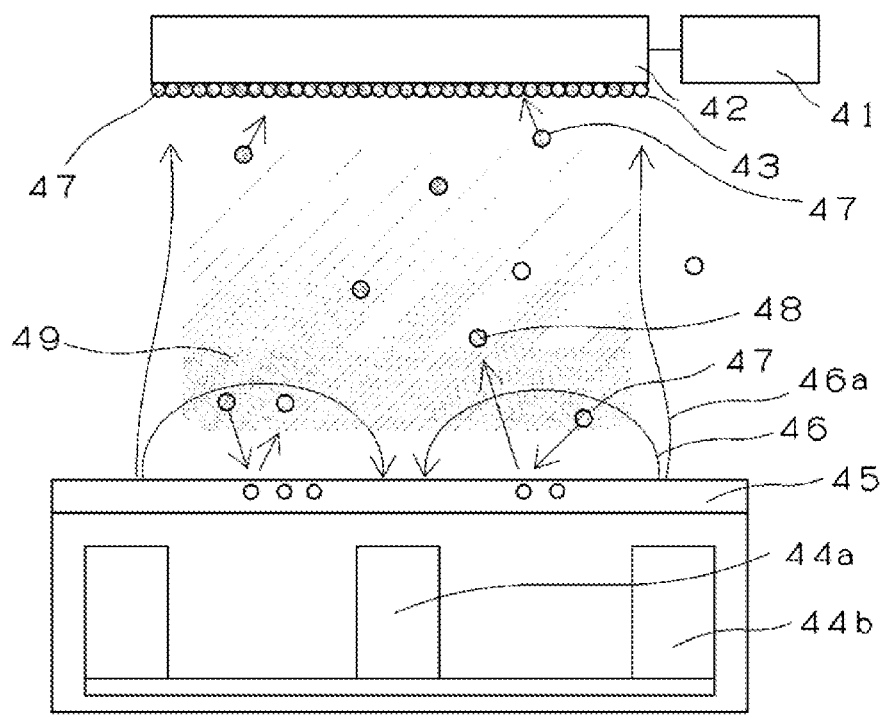
FIG. 8 is a schematic view illustrating a film forming principle of a UBMS method.

It is preferable that the step that forms the foundation layer 8a and the step that forms the mixed layer 8b use the UBMS apparatus that uses Ar gas as a sputtering gas. The film forming principle of the UBMS method to be carried out by using the UBMS apparatus is described with reference to a schematic view shown in FIG. 8. In FIG. 8, a base material 42 corresponds to each of the inner ring, the outer ring, and the rolling element, which are the bearing components on which the hard film is to be formed, however the base material is illustrated as a flat plate. As shown in FIG. 8, the UBMS apparatus has an inner magnet 44a and an outer magnet 44b having different magnetic properties in the central portion of a round target 45 and the peripheral portion thereof. While a high-density plasma 49 is being formed in the neighborhood of the target 45, a part 46a of magnetic field lines 46 generated by the magnets 44a and 44b reaches the neighborhood of the base material 42 connected to a bias power source 41. An effect that Ar plasma generated along the magnetic field lines 46a in sputtering diffuses to the neighborhood of the base material 42 can be obtained. In the UBMS method, a dense film (layer) 43 can be formed owing to an ion assist effect that Ar ions 47 and electrons allow ionized targets 48 to reach the base material 42 along the magnetic field lines 46a which reach the neighborhood of the base material 42 more than normal sputtering methods.

In the step that forms the foundation layer 8a, a Cr target and a WC target are used in combination as the target 45. In the step that forms the mixed layer 8b, the WC target and a graphite target are used in combination as the target 45. In the step that forms the foundation layer 8a, the foundation layer 8a is formed by continuously or stepwise increasing sputtering power to be applied to the WC target and continuously or stepwise decreasing the sputtering power to be applied to the Cr target. With this, the layer having a structure in which the content rate of Cr is decreased and the content rate of WC is increased toward a side of the mixed layer 8b can be obtained.

In the step that forms the mixed layer 8b, the mixed layer 8b is formed by continuously or stepwise increasing the sputtering power to be applied to the graphite target served as the carbon supply source and continuously or stepwise decreasing the sputtering power to be applied to the WC target. With this, the layer having the gradient composition in which the content rate of WC is decreased and the content rate of DLC is increased toward a side of the surface layer 8c.

It is preferable that the step that forms the surface layer 8c uses the UBMS apparatus that uses Ar gas as a sputtering gas. More specifically, it is preferable that this step forms the surface layer 8c by using the UBMS apparatus in such a way that carbon atoms generated from a carbon supply source using the graphite target and the hydrocarbon-based gas in combination are deposited on the mixed layer 8b in a condition in which a ratio of the amount of the hydrocarbon-based gas to be introduced into the UBMS apparatus is set to 1-10 to 100 which is the amount of the Ar gas to be introduced thereinto and the vacuum degree inside the apparatus is set to 0.2-0.8 Pa.

EXAMPLES

As the hard film used in the rolling bearing according to the present invention, the hard film was formed on a predetermined base material (specimen), and the properties of the hard film were evaluated. The wear of the mating material was evaluated by a rolling and sliding test using a two-cylinder test machine. These specimens are described below as examples and comparative examples.

The specimen, the UBMS apparatus, and the sputtering gas used for the evaluation of the hard films are as described below.

(1) Specimen property: quenched and tempered SUJ2 of 750 Hv (2) Specimen: hard film is formed under each condition, on a sliding surface of a polished (the arithmetical mean roughness Ra, the root mean square gradient RΔq, the maximum peak height Rp, and the skewness Rsk are shown in Table 1) SUJ2 ring (φ40×L12, sub-curvature of 60)

(3) UBMS apparatus: UBMS202 produced by Kobe Steel, Ltd.

(4) Sputtering gas: Ar gas

The condition of forming the foundation layer is described below. The inside of a film forming chamber is vacuumed to approximately $5\times10^{-3}$ Pa, and the base material is baked by a heater. After the surface of the base material is etched by means of Ar plasma, a Cr/WC gradient layer in which the composition ratio between Cr and WC is gradient such that the content of Cr is much at a side of the base material and the content of WC is much at a side of the surface is formed by the UBMS method while adjusting the sputtering power applied to the Cr target and the WC target.

The condition of forming the mixed layer is described below. Similar to the foundation layer, the mixed layer is formed by the UBMS method. The mixed layer is formed as a WC/DLC gradient layer in which the composition ratio between WC and DLC is gradient such that the content of WC is much at a side of the base material and the content of DLC is much at a side of the surface while supplying methane gas, which is a hydrocarbon-based gas, and adjusting the sputtering power applied to the WC target and the graphite target.

The arithmetical mean roughness Ra and the root mean square gradient RΔq are made different in each specimen by changing the condition of the surface finishing. The roughness parameters of the surface of each specimen were measured by using a surface roughness measuring instrument (Form•Talysurf PGI830 produced by Taylor Hobson Ltd.). The average value of the values measured five times from five sections of the reference length of 0.8 mm, based on JIS B 0601 are shown in Table 1.

Figure 9:
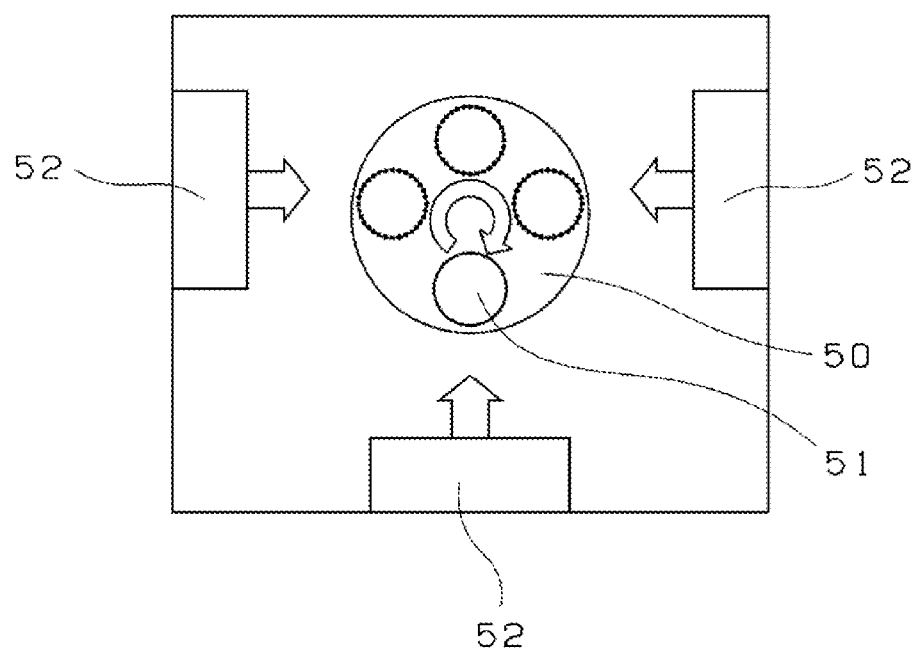
FIG. 9 is a schematic view illustrating a UBMS device.

FIG. 9 is a schematic view illustrating the UBMS apparatus. As shown in FIG. 9, the UBMS apparatus has a UBMS function capable of controlling the property of a film deposited on a base material 51 arranged on a disk 50 by increasing a plasma density in the neighborhood of the base material 51 to enhance the ion assist effect (see FIG. 8), with a sputtering vaporization source material (target) 52 being subjected to an unbalanced magnetic field. This apparatus is capable of forming a composite film that combines any UBMS films (including a gradient composition), on the base material. In this example, the foundation layer, the mixed layer, and the surface layer are formed as the UBMS film on the ring served as the base material.

Examples 1 to 7 and Comparative Examples 1 to 3

After the base materials shown in Table 1 were ultrasonically cleaned with acetone, the base materials were dried. Thereafter, each of the base materials was mounted on the UBMS apparatus to form the foundation layer and the mixed layer in the film forming condition described above. The DLC film, which is the surface layer, was formed on each of the mixed layers to obtain a specimen having a hard film. The film forming condition of the surface layer is that the vacuum degree inside the film forming chamber is 0.8 Pa, the bias voltage relative to the base material is 50 V, and the ratio of the amount of the methane gas to be introduced into the apparatus is 1 (part by volume) to 100 (parts by volume) which is the amount of the Ar gas to be introduced thereinto. The results are also shown in Table 1. The film thickness in Table 1 is a total thickness of the three layers (foundation layer, mixed layer, and surface layer).

<Rolling and Sliding Test Using Two-Cylinder Test Machine>

Figure 10:
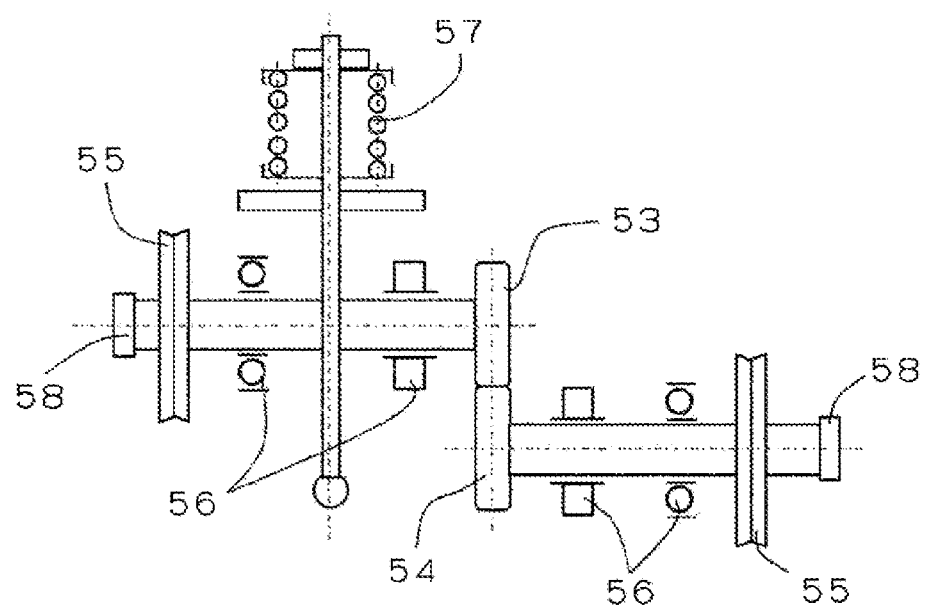
FIG. 10 is a schematic view illustrating a two-cylinder test machine.

A wear test of the mating material was performed for each of the obtained specimens by using the two-cylinder test machine shown in FIG. 10. The two-cylinder test machine is provided with a driving side specimen 53, and a driven side specimen 54 brought into rolling and sliding contact with the driving side specimen 53. Respective specimens (rings) are supported by support bearings 56, and a load is applied to the respective specimens by a loading spring 57. FIG. 10 also shows a driving pulley 55 and a non-contact rotation speed indicator 58. The attackability to the mating material was evaluated from a wear depth of the mating material side ring. A specific test condition is described below. The wear depth of the mating material side ring was measured by using the surface roughness measuring instrument (Form•Talysurf PGI830 produced by Taylor Hobson Ltd.). The wear depth is a depth relative to a reference surface.

(Test Condition)

Mating material: grinding-finished (0.02 μmRa) SUJ2 ring (φ40×L12, sub-curvature of 60)

Lubrication oil: VG320 equivalent oil (including additives), supplied using felt pad Maximum contact surface pressure: 1.5 GPa Rotation speed: (specimen side) 127 minute$^{-1}$, (mating material side) 126 minute$^{-1}$ Relative sliding rate: 0.8%

Close time: 72 hours however the attackabilities to the mating material are remarkably different because of the difference of the root mean square gradients RΔq thereof. The reason is likely considered that the tip radius of the projection is made gentle and the stress concentration is relaxed.

Example 6 and Example 3 are similar in the arithmetical mean roughness Ra and the root mean square gradient RΔq, however the attackabilities to the mating material are different from each other. The reason is likely considered that the skewness Rsk is positive value and therefore there are many projections projecting upward in Example 6. Further, it is not considered that the wear of the mating material becomes large as the skewness Rsk becomes small in view of the result of Example 5, and therefore it is important that the skewness Rsk is less than 0 for suppressing the attackability to the mating material.

As described above, the present invention sets the state of the surface of the base material using the arithmetical mean roughness Ra and the root mean square gradient RΔq in the roughness curve so as to relax the stress concentration on the projection and suppress the wear of the mating material when the hard film and the mating material are brought into contact with each other.

INDUSTRIAL APPLICABILITY

The rolling bearing according to the present invention has the DLC film formed on, for example, the inner ring raceway

TABLE 1

| | Example 1 | Example 2 | Example 3 | Example 4 | Example 5 | Example 6 | Example 7 | Comparative example 1 | Comparative example 2 | Comparative example 3 |
|---|---|---|---|---|---|---|---|---|---|---|
| Base material | SUJ2 | SUJ2 | SUJ2 | SUJ2 | SUJ2 | SUJ2 | SUJ2 | SUJ2 | SUJ2 | SUJ2 |
| Hardness of surface layer (GPa) | 23.2 | 23.2 | 23.2 | 23.2 | 23.2 | 23.2 | 23.2 | 23.2 | 23.2 | 23.2 |
| Material of foundation layer [1] | Cr/WC | Cr/WC | Cr/WC | Cr/WC | Cr/WC | Cr/WC | Cr/WC | Cr/WC | Cr/WC | Cr/WC |
| Material of mixed layer [2] | WC/DLC | WC/DLC | WC/DLC | WC/DLC | WC/DLC | WC/DLC | WC/DLC | WC/DLC | WC/DLC | WC/DLC |
| Film thickness (μm) | 2.1 | 2.1 | 2.1 | 2.1 | 2.1 | 2.1 | 2.1 | 2.1 | 2.1 | 2.1 |
| Surface roughness of base material | | | | | | | | | | |
| Ra (μm) | 0.11 | 0.12 | 0.21 | 0.29 | 0.12 | 0.22 | 0.20 | 0.11 | 0.22 | 0.22 |
| RΔq | 0.015 | 0.025 | 0.032 | 0.045 | 0.027 | 0.028 | 0.034 | 0.072 | 0.098 | 0.075 |
| Rsk | −0.7 | −0.6 | −0.5 | −0.9 | −1.5 | 0.22 | −0.4 | 0.12 | 0.2 | −0.5 |
| Rp (μm) | 0.22 | 0.24 | 0.31 | 0.38 | 0.26 | 0.25 | 0.62 | 0.69 | 0.81 | 0.32 |
| Rolling and sliding test using two-cylinder test machine) | | | | | | | | | | |
| Wear depth (μm) | 0.02 | 0.11 | 0.15 | 0.22 | 0.09 | 0.35 | 0.16 | 0.72 | 1.15 | 1.08 |

[1] This layer corresponds to the foundation layer of Cr and WC in the present invention. In a case in which two components are mixed, it shows "first component/second component".
[2] This layer corresponds to the mixed layer of WC and DLC in the present invention. In a case two components are mixed, it shows "first component/second component".

Table 1 shows a result of the two-cylinder rolling and sliding test. The base materials and the film forming conditions of the surface layer adopted are identical to each other. The average of the hardness of the surface layers is approximately 23 GPa. In a case in which the arithmetical mean roughness Ra of the roughness curve that indicates the surface roughness of the surface on which the hard film is formed is 0.3 μm or less and the root mean square gradient RΔq thereof is 0.05 or less (Examples 1 to 7), the wear of the mating material in the two-cylinder rolling and sliding test is less and therefore the attackability to the mating material is decreased. In particular, Example 3 and Comparative example 3 are similar in the arithmetical mean roughness Ra, the skewness Rsk, and the maximum peak height Rp, surface, the outer ring raceway surface or the rolling contact surface of the rolling element, and the rolling bearing is superior in the peeling resistance of the DLC film even when operated in a severe lubrication state, and thereby the rolling bearing shows the properties of the DLC itself. Consequently, the rolling bearing is superior in its seizure resistance, wear resistance, and corrosion resistance. Further, the attackability to the mating material is suppressed. Thus, the rolling bearing according to the present invention can be applied to various uses including a use in the severe lubrication state. In particular, the rolling bearing according to the present invention is suitable to be applied to the wind power generation rotor shaft support device.

REFERENCE SIGNS LIST

1: rolling bearing (deep groove ball bearing)
2: inner ring
3: outer ring
4: rolling element
5: cage
6: sealing member
7: grease
8: hard film
11: wind power generator
12: blade
13: rotor shaft
14: nacelle
15: double-row self-aligning roller bearing (rolling bearing)
16: speed increaser
17: generator
18: support base
19: motor
20: speed reducer
21: inner ring
22: outer ring
23: roller
24: cage
25: bearing housing
26: seal
27: revolving seat bearing
28: hard film
41: bias power source
42: base material
43: film (layer)
45: target
46: magnetic field line
47: Ar ion
48: ionized target
49: high-density plasma
50: disk
51: base material
52: sputtering vaporization source material (target)
53: driving side specimen
54: driven side specimen
55: driving pulley
56: support bearing
57: loading spring
58: non-contact rotation speed indicator

The invention claimed is:

1. A rolling bearing comprising:
an inner ring having an inner ring raceway surface on an outer circumference;
an outer ring having an outer ring raceway surface on an inner circumference;
rolling elements that roll between the inner ring raceway surface and the outer ring raceway surface, wherein the inner ring, the outer ring, and the rolling elements are formed of iron-based material; and
a hard film comprising: a foundation layer formed directly on at least one surface selected from among the inner ring raceway surface, the outer ring raceway surface, and a rolling contact surface of the rolling element and mainly formed of chromium and tungsten carbide; a mixed layer formed on the foundation layer and mainly formed of tungsten carbide and diamond-like carbon; and a surface layer formed on the mixed layer and mainly formed of diamond-like carbon,
wherein:
the mixed layer has a composition in which a content rate of the tungsten carbide in the mixed layer is continuously or stepwise decreased and a content rate of diamond-like carbon in the mixed layer is continuously or stepwise increased from a side of the foundation layer toward a side of the surface layer; and
in a roughness curve of a surface on which the foundation layer is formed, the arithmetical mean roughness Ra is 0.3 μm or less and the root mean square gradient RΔq is 0.05 or less.

2. The rolling bearing according to claim 1, wherein the skewness Rsk acquired from the roughness curve of the surface on which the foundation layer is formed is −0.2 or less.

3. The rolling bearing according to claim 1, wherein the surface layer has a gradient layer of which the hardness is continuously or stepwise increased from a side of the mixed layer, at a side of the mixed layer.

4. The rolling bearing according to claim 1, wherein the iron-based material is high carbon chromium bearing steel, carbon steel, tool steel, or martensitic stainless steel.

5. The rolling bearing according to claim 1 configured to support a rotor shaft to which a blade of a wind power generator is mounted,
wherein:
the rolling bearing is formed as a double-row self-aligning roller bearing comprising rollers interposed between the inner ring and the outer ring, as the rolling elements to be aligned in two rows in an axial direction;
the outer ring raceway surface is formed in a spherical shape; and
the outer circumference of each of the rollers is formed in a shape along the outer ring raceway surface.

6. A wind power generation rotor shaft support device comprising one or more bearings disposed in a housing, the bearings being configured to support a rotor shaft to which a blade is mounted,
wherein at least one of the bearings is formed as the double-row self-aligning roller bearing according to claim 5, and
wherein a part of the double-row self-aligning roller bearing, in a row far away from the blade is configured to receive a large load compared to a part of the double-row self-aligning roller bearing, in a row close to the blade.

* * * * *